Patented Mar. 13, 1945

2,371,550

UNITED STATES PATENT OFFICE 2,371,550

TREATMENT OF PHENOLS

Raymond E. Schaad, Chicago, Ill., assignor to Universal Oil Products Company, Chicago, Ill., a corporation of Delaware No Drawing. Application February 20, 1942, Serial No. 431,667

10 Claims. (Cl. 260—624)

This application is a continuation-in-part of my copending application Serial No. 391,099, filed April 30, 1941, now Patent No. 2,290,211, July 21, 1942.

This invention relates to the treatment of phenols to produce alkylated phenols. More specifically it is concerned with the production of mono-alkylated and poly-alkylated phenols in the presence of a catalyst.

It is recognized that in general the catalytic alkylation of phenols has been known for some time. However, the present invention differentiates from the prior art on this subject in the use of a particular catalytic material comprising as its active ingredient an acid phosphate of an alkaline earth metal.

The phenols constitute an important class of chemical compounds which occur in varying amounts in the products obtained when distilling various carbonaceous materials such as coal, shale, lignite, peat, wood, etc. Many of these individual compounds and the commercial mixtures obtained from primary distillation products have value as germicides and insecticides and as intermediate products for the manufacture of more complicated substances such as, for example, certain resinous condensation products produced by reacting phenols with aldehydes. Alkylated phenols or mixtures thereof, such as produced by the process of the present invention, may be utilized as inhibitors, insecticides, germicides, etc., and as intermediates in the synthesis of dyes, resins, etc.

In one specific embodiment the present invention comprises a process for producing alkylated phenols which comprises subjecting a phenol and an olefinic hydrocarbon to contact under alkylating conditions in the presence of a catalyst comprising as its active ingredient an acid phosphate of an alkaline earth metal.

Phenols which are alkylatable by olefinic hydrocarbons and olefin-producing substances as hereinafter set forth have at least one hydroxy group attached directly to a benzene ring. The term phenol as used in this specification and in the claims relates to any of a series of hydroxyl derivatives of benzene or its homologs formed by replacing one and generally not more than four of the benezene hydrogens by a hydroxyl group. The monohydric phenols comprise phenol, cresols, xylenols, etc., while the dihydric phenols include pyrocatechol, resorcinol, and hydro-quinone. Pyrogallol is an example of a trihydric phenol.

The process of this invention is also applicable to the alkylation of certain substituted phenols such as bromo-phenols, chloro-phenols, amino-phenols, etc., although not necessarily under the same conditions of operation utilizable with the unsubstituted phenols themselves. Many mono-alkylated phenols may be converted into more highly alkylated phenols by the process of this invention.

Olefinic hydorcarbons utilizable as alkylating agents in the present instance comprise mono-olefins and poly-olefins. Olefins which are employed in the present process are either normally gaseous or normally liquid and comprise ethylene and its higher homologs, both gaseous and liquid, the latter including various polymers of normally gaseous olefins, but these different olefinic hydrocarbons and those mentioned hereinafter are not necessarily equivalent in their action as alkylating agents. Cyclic olefins may also serve in alkylating phenols but generally under conditions of operation different from those employed when alkylating phenols by non-cyclic olefins. Other olefinic hydrocarbons which may be interacted with the above indicated phenols include conjugated diolefins such as butadiene and isoprene, also non-conjugated diolefins, and other poly-olefins. Olefinic hydrocarbons utilizable as alkylating agents are present in products of thermal and catalytic cracking of oils, in those obtained by dehydrogenating paraffinic and olefinic hydrocarbons or in the products resulting from dehydrating alcohols.

Alkylation of phenols may also be effected in the presence of catalysts hereinafter described by charging with the phenol a substance capable of producing olefinic hydrocarbons under the operating conditions chosen for the reaction. Such olefin-producing substances which contain an alkoxy group include alcohols, ethers, and esters, which are capable of undergoing dehydration or splitting to olefinic hydrocarbons, containing at least two carbon atoms per molecule, which may be considered as present in the reaction mixture even though possibly as transient intermediate compounds which react further with phenols to produce desired alkylation products.

Catalysts suitable for use in effecting the process of the present invention comprise alkaline earth acid phosphates and particularly the mono-alkaline earth acid phosphates, also termed the dihydrophosphates, of calcium, strontium, and barium. As an example of these salts, the mono-calcium salt of ortho phosphoric acid is represented by the formula $Ca(H_2PO_4)_2 \cdot H_2O$ for the hydrated salt or as $Ca(H_2PO_4)_2$ when water of hydration is absent. An acid salt of an acid of phosphorus and of an alkaline earth metal may be used as such or it may be mixed with or deposited upon carriers or supporting materials such as silica, diatomaceous earth, alumina, silica-alumina composites, crushed porcelain, pumice, firebrick, etc.

A composite of an alkaline earth acid phosphate and a carrier in finely powdered form, after thorough mechanical mixing, may be subjected to drying, pelleting, and heating operations to produce formed particles of catalyst suitable for use as reactor packing material, or the alkaline earth acid phosphate itself may be similarly formed into pellets or granules. A suitable carrier may also be impregnated with a selected acid phosphate to form a composite catalyst suitable for use in promoting interaction of phenols and olefinic hydrocarbons. A suitable catalytic material may be prepared by adding to di-calcium phosphate or tri-calcium phosphate the calculated amount of ortho-phosphoric acid to form a composite with a composition corresponding to that of mono-calcium phosphate. Thus addition of phosphoric acid to an alkaline earth phosphate forms a catalyst of desired alkylating activity, but in general an acid phosphate containing no free phosphoric acid has sufficient activity for catalyzing the process as herein described. The different alkylating catalysts which may be employed in the present process are not necessarily equivalent in their action.

Further, when an acid phosphate is used in connection with a carrier, the proportions of carrier and active ingredient may be varied as desired to make catalyst composites of different activities. Accordingly, catalytic material of appropriate activity is thus available for use with normal, secondary, and tertiary olefins, the latter generally being the most reactive.

There is relatively little formation of carbon or carbonaceous material upon the preferred types of catalysts when the reactions between phenols and olefinic hydrocarbons are carried out under hydrogen pressure, but carbon formation does occur to a substantial extent in the absence of hydrogen.

In effecting reaction between phenols and an alkylating agent such as an olefinic hydrocarbon according to the process of the present invention, the exact method of procedure varies with the nature of the reacting constituents. A simple procedure, utilizable in the case of a phenol which is normally liquid, or if solid is readily soluble or easily dispersible in a substantially inert liquid, and a normally gaseous or liquid olefinic hydrocarbon, consists in contacting the phenol and olefinic hydrocarbon with a catalyst containing an acid phosphate of an alkaline earth metal at a temperature of from about 100° to about 450° C. and preferably between about 250° and about 400° C. under a pressure up to about 200 atmospheres or more. Intimate contact of the reacting components with the catalyst is effected by passing the reaction mixture through a fixed bed of granular or pelleted catalyst or the reacting components may be mixed with finely divided catalyst and reacted in either a batch or continuous type of operation. The materials subjected to reaction are preferably in the proportion of 1 molecular proportion of olefinic hydrocarbons to between about 2 and about 20 molecular proportions of phenols in order to diminish polymerization of olefinic hydrocarbons and to favor interaction of olefinic hydrocarbons with the phenol or mixture of phenols in the mixture undergoing treatment.

Thus a mixture comprising essentially a phenol and a fraction containing olefinic hydrocarbons are commingled and passed through a reactor containing an acid phosphate such as monocalcium acid phosphate, or at least a portion of the phenolic material is charged to such a reactor while the fraction containing olefinic hydrocarbons, as such or preferably diluted by another portion of the phenol being treated, is introduced at various points between the inlet and outlet of the reaction zone in such a way that the reaction mixture being contacted with the catalyst will at all times contain a relatively low proportion of the olefinic hydrocarbon and thus favor interaction of phenols and olefinic hydrocarbons rather than polymerization of the latter. The phenol being treated may be in liquid or molten condition or it may be dissolved or dispersed in a substantially inert liquid as a liquid paraffin hydrocarbon fraction.

While the method of passing the phenols and olefinic hydrocarbons, either together or countercurrently, through a suitable reactor containing the granular catalyst is generally customary procedure, the interaction of these compounds may also be effected in a closed vessel in which some of the reacting constituents are in liquid phase and in which the catalyst is preferably in finely divided form and is maintained in dispersion or suspension by some method of agitation. The choice of operating procedure is dependent upon the circumstances such as the temperature, pressure, and activity of the catalyst found to be most effective for producing the desired reaction between particular phenols and olefinic hydrocarbons.

Alkaline earth acid phosphates as herein described permit continuous reaction of phenolic compounds and olefinic hydrocarbons in the presence of a fixed bed of catalyst and thus make it possible to avoid mechanical problems as well as oxidation and corrosion difficulties encountered when this reaction is carried out in the presence of sulfuric acid which is sometimes used as an alkylating catalyst. Further, an acid phosphate such as calcium acid phosphate also has the advantage over aluminum chloride utilizable for the same purpose in that an acid phosphate forms substantially no addition compounds or complexes with phenols and/or olefinic hydrocarbons as is characteristic of catalysts containing aluminum chloride.

Reactions between olefinic hydrocarbons and phenols in the presence of an alkaline earth acid phosphate are apparently of a relatively simple character although they may be accompanied by certain amounts of decomposition or destructive hydrogenation, the latter being in evidence particularly when the reaction is carried out under a relatively high hydrogen pressure at a relatively high temperature.

While the reaction is not understood completely, a typical alkylation of a phenol apparently involves the addition of the phenol to a double bond of an olefinic hydrocarbon to produce an alkylated phenol which may in turn undergo further reaction with 1 or more molecular proportions of olefinic hydrocarbon thus producing dialkylated and poly-alkylated phenols. In case the alkylating agent is a diolefin or other polyolefin, the interaction with a phenol may involve not only alkylation but possibly polymerization. Thus phenol and butadiene may give a substantial yield of butenyl phenols which polymerize. Within certain limits, however, it is possible to produce mainly mono-alkylated phenols by proper adjustment of catalyst activity, ratio of phenol to olefinic hydrocarbons, operating conditions of temperature, pressure, rates of feed of the reacting components, etc.

The reaction between a phenol and a hexene or other normally liquid olefin of higher molecular weight may involve not only addition of phenol and olefinic hydrocarbons but also a depolymerization or splitting of the olefinic hydrocarbon into olefinic fragments of lower molecular weights which react with the phenolic compound to produce alkylated phenols. Thus phenol and di-isobutene or tri-isobutene react and yield tertiary butyl phenol and poly-tertiary butyl phenols, while nonene and phenol yield both butyl and amyl phenols by so-called depoly-alkylation.

In general, the products formed by interaction of an olefinic hydrocarbon with a molal excess of a phenol are separated from the unreacted phenol by suitable means as by distillation, and the unreacted portion of the phenol originally charged and generally the poly-alkylated phenols formed are returned to the process and mixed with additional quantities of the olefinic hydrocarbons and phenol being charged to contact with the catalyst. This recycling of poly-alkylated phenols sometimes aids in the production of mainly mono-alkylated phenols and depresses the formation of more highly alkylated derivatives. The total alkylated product thus freed from the excess of the originally charged phenol is separated into desired fractions by distillation at ordinary or reduced pressure or by other suitable means.

The following example is given to illustrate the character of results obtained by the use of the present process, although the example given is not introduced with the intention of unduly restricting the generally broad scope of the invention.

81 grams of phenol, 20 grams of propene, and 10 grams of mono-calcium phosphate were introduced to a rotatable autoclave of 850 cc. capacity and placed under an initial nitrogen pressure of 50 atmospheres. The autoclave and contents were then heated for 4 hours at 300° C. under a maximum pressure of 110 atmospheres.

After the reaction and when the autoclave had cooled to room temperature the reaction mixture was removed from the autoclave and separated into 97 grams of liquid product and 10.5 grams of white catalyst powder. The liquid product was further separated into an alkali-soluble and an alkali-insoluble portion by extracting an ether solution thereof with several portions of an aqueous solution containing 10% of sodium hydroxide. The alkaline solution containing dissolved phenolic compounds was acidified with hydrochloric acid, then extracted with ether, and the ether extract was dried and distilled. This distillation separated the purified phenolic compounds into 38 cc. of unreacted phenol which crystallized on standing, 6.2 cc. of an intermediate fraction boiling between 190° and 213° C., 18.1 cc. of a fraction boiling between 213° and 220° C. consisting essentially of ortho-isopropyl phenol, and 4.8 cc. of higher boiling material. The alkali insoluble material was distilled and separated into 1.7 cc. boiling between about 202° and 214° C., 5.2 cc. boiling between 214° and 225° C., 4.7 cc. boiling between 225° C. and 240° C., and 2.8 cc. of higher boiling material. The total of 9.9 cc. of material boiling between 214° and 240° C. contained substantial amounts of ortho-isopropylphenyl-isopropyl ether which boiled between 222° and 230° C.

A comparative run on phenol and propylene under the same conditions indicated above but in the absence of a catalyst yielded no alkylation product and the phenol charged was recovered unchanged.

The nature of the present invention and its commercial utility can be seen from the specification and example given, although neither section is intended to limit its generally broad scope.

I claim as my invention:

1. A process for producing alkylated phenols which comprises reacting a phenol with an olefinic hydrocarbon at a temperature of from about 100° C. to about 450° C. in the presence of a catalyst comprising essentially an acid phosphate of an alkaline earth metal.

2. A process for producing alkylated phenols which comprises subjecting a phenol and an olefinic hydrocarbon to contact at a temperature of from about 100° to about 450° C. under a pressure of from substantially atmospheric to approximately 200 atmospheres in the presence of a catalyst comprising essentially an acid phosphate of an alkaline earth metal.

3. A process for producing alkylated phenols which comprises subjecting a phenol and a normally gaseous olefinic hydrocarbon to contact at a temperature of from about 100° to about 450° C. under a pressure of from substantially atmospheric to approximately 200 atmospheres in the presence of a catalyst comprising essentially an acid phosphate of an alkaline earth metal.

4. A process for producing alkylated phenols which comprises subjecting a phenol and a normally liquid olefinic hydrocarbon to contact at a temperature of from about 100° to about 450° C. under a pressure of from substantially atmospheric to approximately 200 atmospheres in the presence of a catalyst comprising essentially an acid phosphate of an alkaline earth metal.

5. A process for producing alkylated phenols which comprises subjecting a phenol and an olefinic hydrocarbon to contact at a temperature of from about 100° to about 450° C. under a pressure of from substantially atmospheric to approximately 200 atmospheres in the presence of a catalyst comprising essentially a calcium acid phosphate.

6. A process for producing alkylated phenols which comprises subjecting a phenol and an olefinic hydrocarbon to contact at a temperature of from about 100° to about 450° C. under a pressure of from substantially atmospheric to approximately 200 atmospheres in the presence of a catalyst comprising essentially calcium dihydrophosphate.

7. A process for producing alkylated phenol which comprises subjecting phenol and an olefinic hydrocarbon to contact at a temperature of from about 100° to about 450° C. under a pressure of from substantially atmospheric to approximately 200 atmospheres in the presence of a catalyst comprising essentially calcium dihydrophosphate.

8. A process for producing ethylated phenol which comprises subjecting phenol and ethylene to contact at a temperature of from about 100° to about 450° C. under a pressure of from substantially atmospheric to approximately 200 atmospheres in the presence of a catalyst comprising essentially calcium dihydrophosphate.

9. A process for producing propylated phenol which comprises subjecting phenol and propene to contact at a temperature of from about 100° to about 450° C. under a pressure of from substantially atmospheric to approximately 200 atmospheres in the presence of a catalyst comprising essentially calcium dihydrophosphate.

10. A process for producing alkylated phenols which comprises subjecting a phenol and an olefinic hydrocarbon to contact at a temperature of from about 100° to about 450° C. in the presence of a catalyst comprising essentially a composite of an acid phosphate of an alkaline earth metal and a substantially inert carrier.

RAYMOND E. SCHAAD.